United States Patent
Ruffini et al.

(10) Patent No.: US 9,124,914 B2
(45) Date of Patent: Sep. 1, 2015

(54) CREDIT/PENALTY-BASED NETWORK-GUIDANCE OF BITRATES FOR CLIENTS

(71) Applicant: Verizon Patent and Licensing Inc., Basking Ridge, NJ (US)

(72) Inventors: Michael P. Ruffini, Methuen, MA (US); Dongchen Wang, Concord, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 148 days.

(21) Appl. No.: 14/065,500

(22) Filed: Oct. 29, 2013

(65) Prior Publication Data

US 2015/0121407 A1    Apr. 30, 2015

(51) Int. Cl.
| | |
|---|---|
| H04N 21/24 | (2011.01) |
| H04N 21/63 | (2011.01) |
| H04N 21/2662 | (2011.01) |
| H04N 21/6373 | (2011.01) |
| H04N 21/647 | (2011.01) |
| H04N 21/442 | (2011.01) |
| H04N 7/173 | (2011.01) |
| H04N 21/472 | (2011.01) |
| H04N 21/258 | (2011.01) |
| H04N 21/488 | (2011.01) |
| H04N 21/4784 | (2011.01) |

(52) U.S. Cl.
CPC ....... *H04N 21/2662* (2013.01); *H04N 7/17309* (2013.01); *H04N 21/2402* (2013.01); *H04N 21/25825* (2013.01); *H04N 21/44209* (2013.01); *H04N 21/4784* (2013.01); *H04N 21/47202* (2013.01); *H04N 21/4882* (2013.01); *H04N 21/6373* (2013.01); *H04N 21/64769* (2013.01)

(58) Field of Classification Search
None
See application file for complete search history.

(56) References Cited

U.S. PATENT DOCUMENTS

2002/0015442 A1* 2/2002 Takeuchi et al. ............... 375/211
2009/0288129 A1* 11/2009 Wolfe et al. .................. 725/116

* cited by examiner

*Primary Examiner* — Cai Chen

(57) ABSTRACT

A method, a device, and a non-transitory storage medium having instructions to obtain network state information pertaining to at least a portion of a network that provides an adaptive bitrate streaming service; generate a recommended bitrate for delivery of a program based on the network state information; transmit the recommended bitrate to user devices; monitor a compliance and a non-compliance of the recommended bitrate by the user devices; and assign a credit commensurate with the compliance of the recommended bitrate to each of the user devices that complied with the recommended bitrate and a penalty commensurate with the non-compliance of the recommended bitrate to each of the user devices that did not comply with the recommended bitrate.

23 Claims, 12 Drawing Sheets

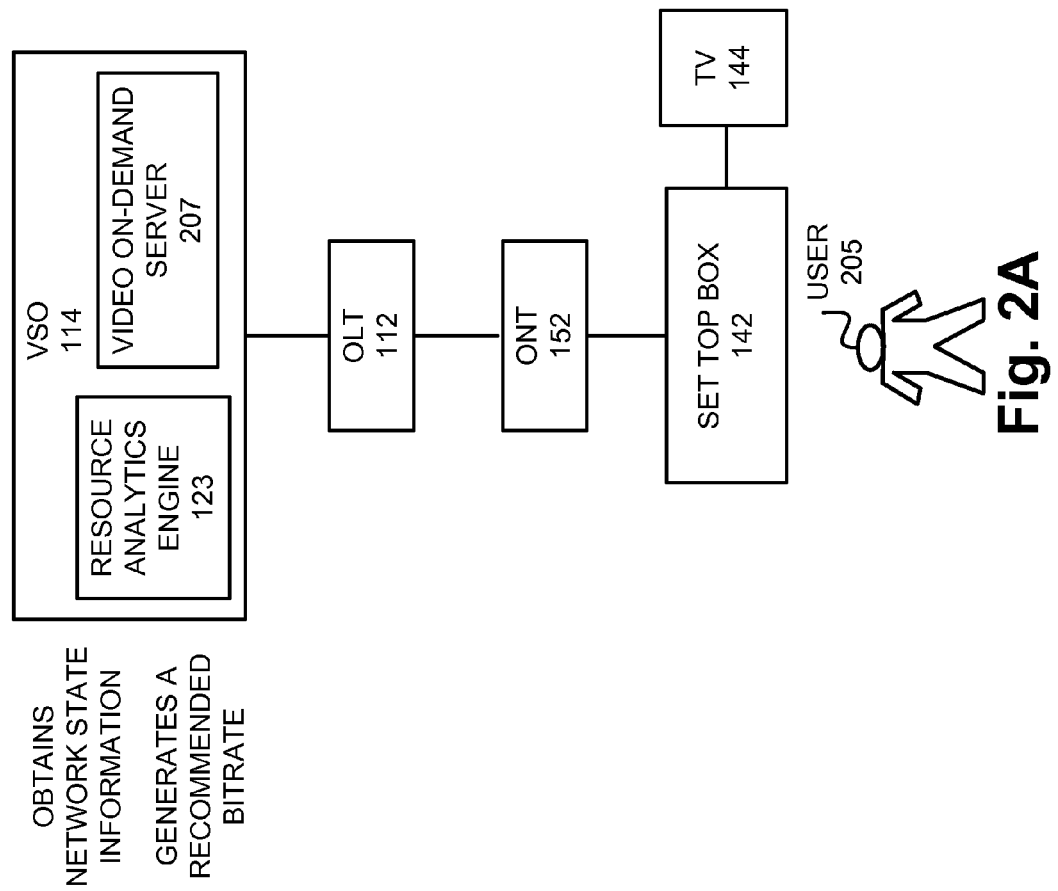

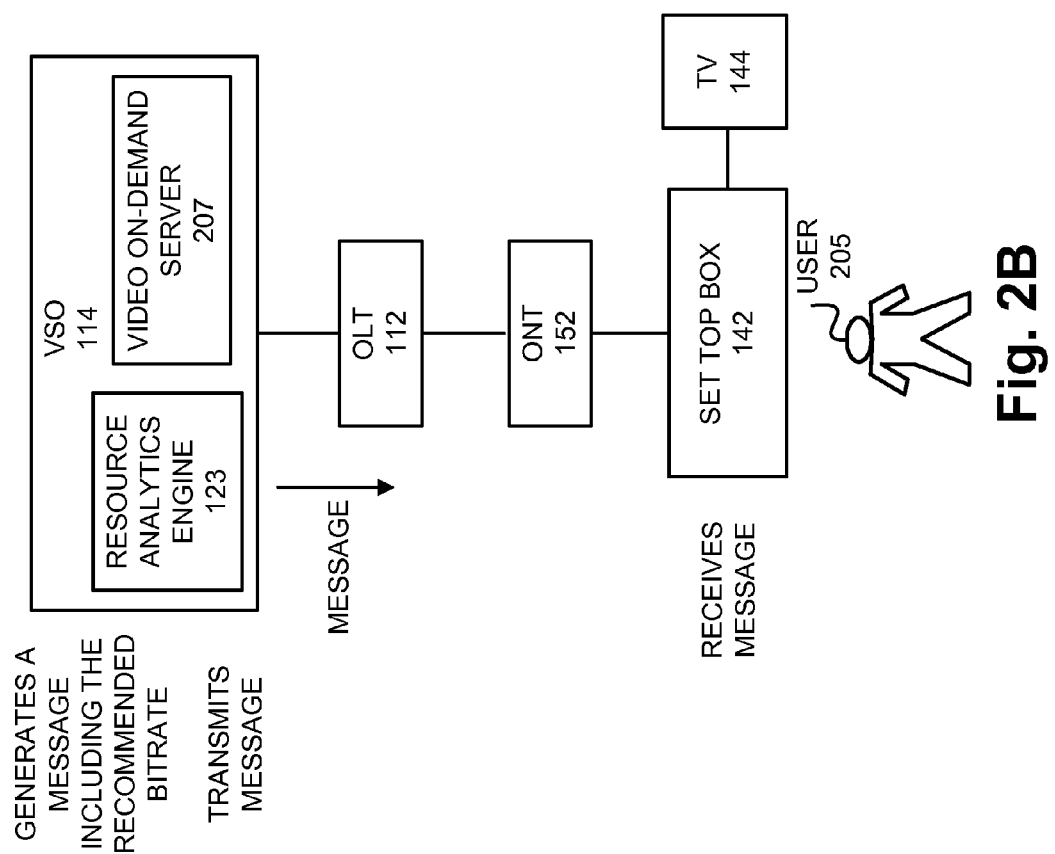

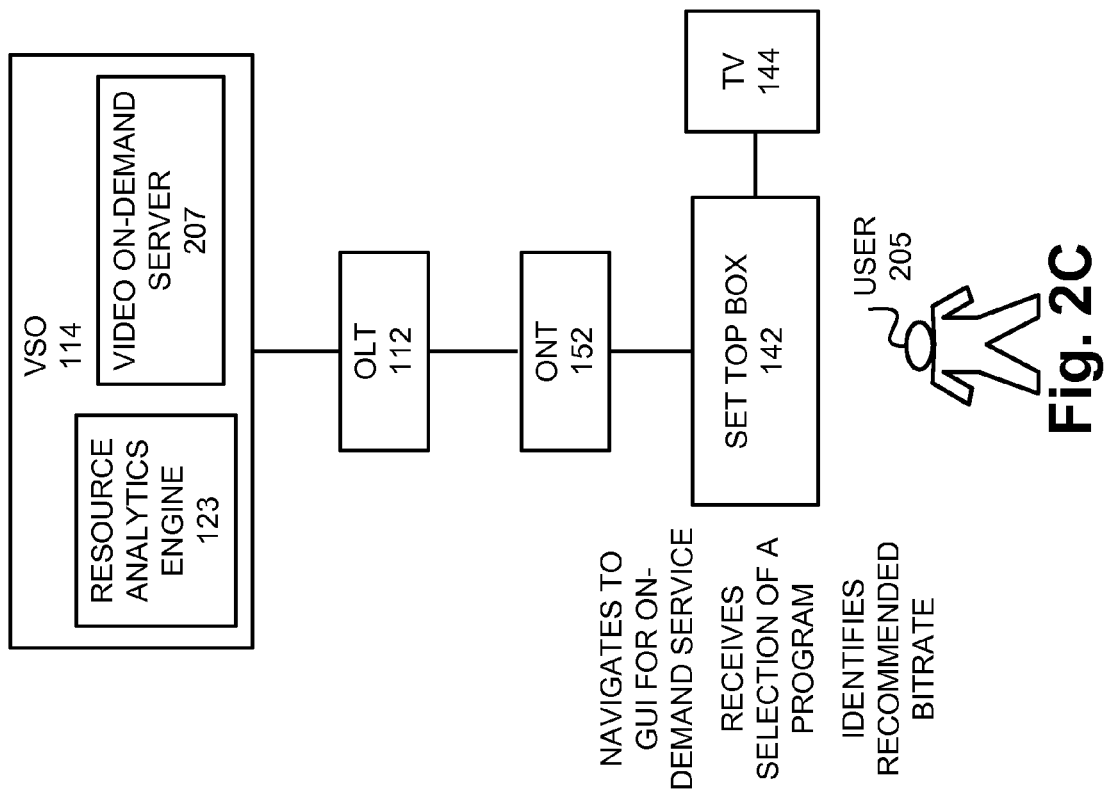

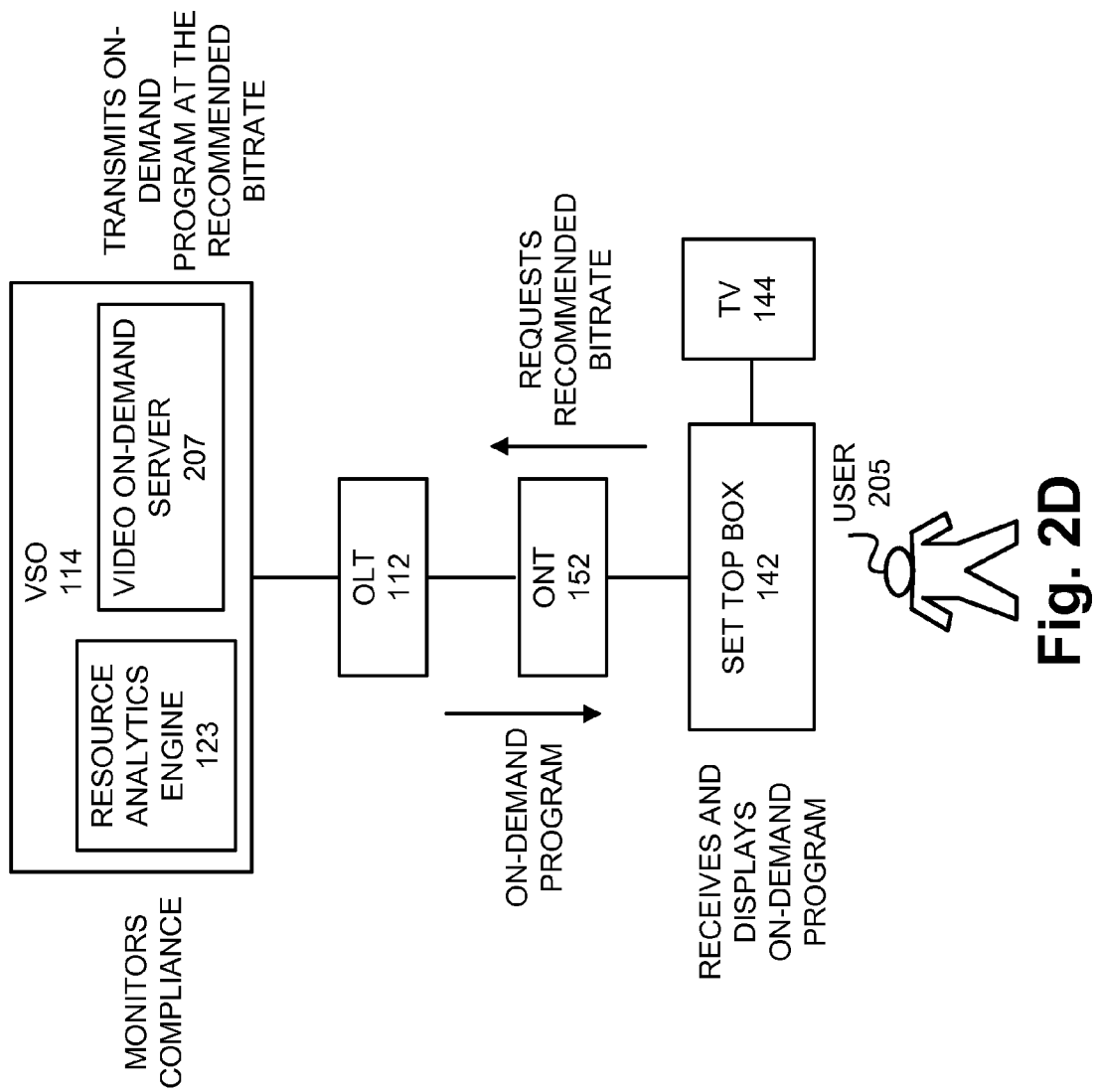

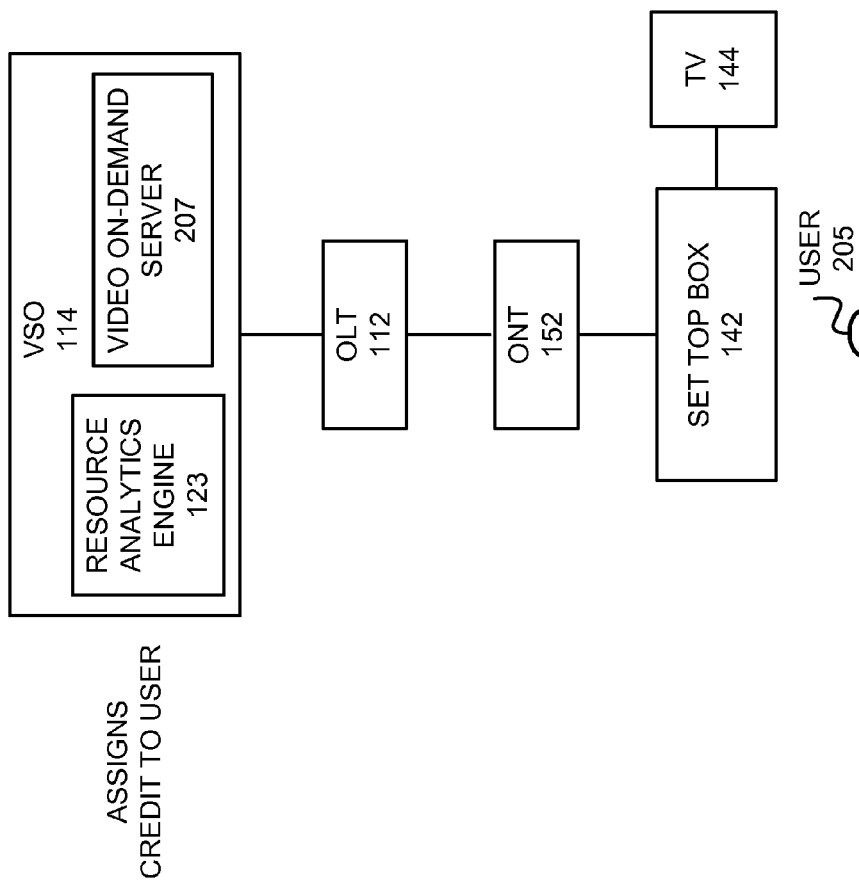

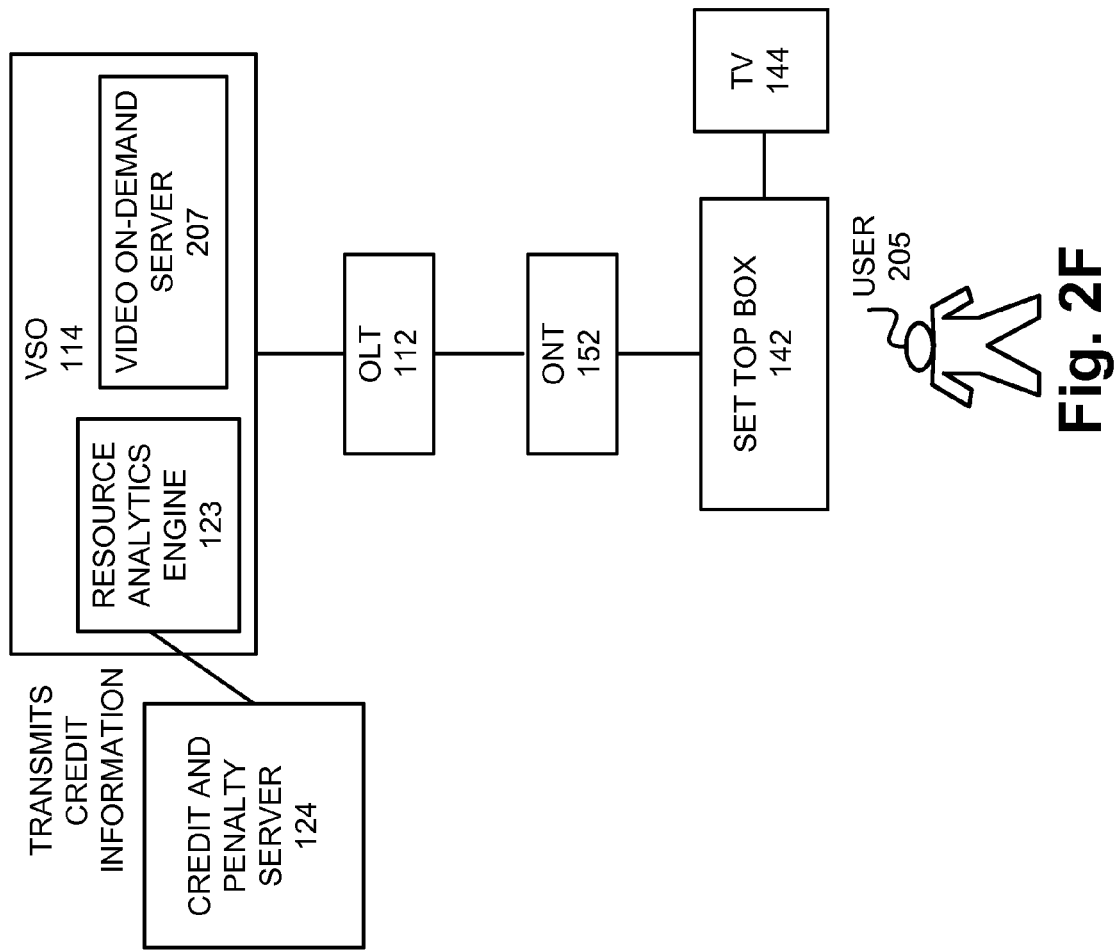

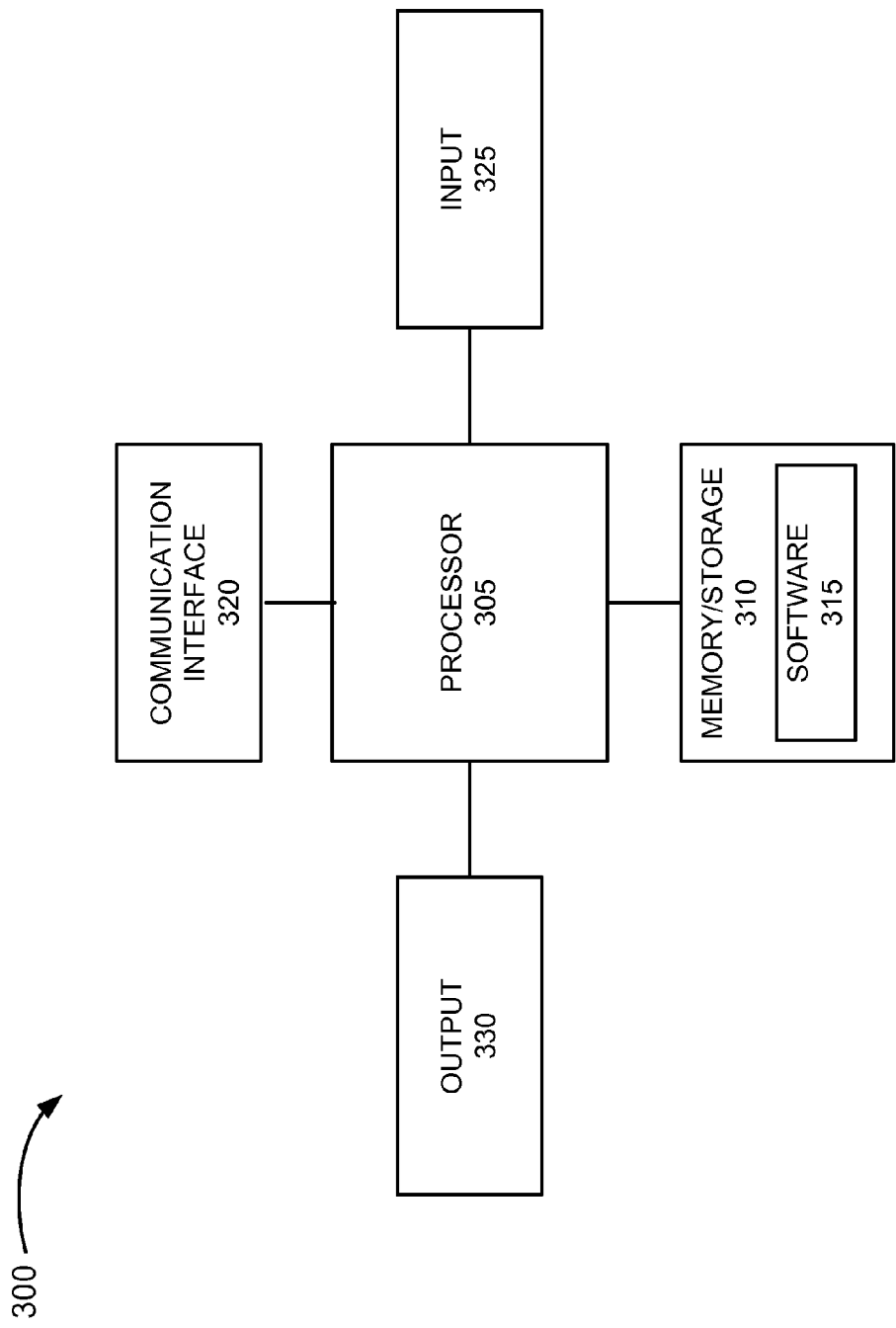

CREDIT/PENALTY-BASED NETWORK-GUIDANCE OF BITRATES FOR CLIENTS

BACKGROUND

Streaming and downloading of programs are popular delivery methods for providing the programs to users. A content delivery network (CDN) (also known as a content distribution network) is typically used for streaming and/or downloading the programs. The content delivery network stores the programs and services requests for the programs.

BRIEF DESCRIPTION OF THE DRAWINGS

FIGS. 2A-2F are diagrams that illustrate an exemplary process pertaining to the bitrate guidance service;

FIG. 3 is a diagram illustrating exemplary components of a device that may correspond to one or more of the devices in the exemplary environment;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

A television service provider or another type of service provider (e.g., a mobile service provider, an Internet service provider) may offer an on-demand service for programs. There are various protocols that may be used to deliver a program, such as the Real Time Streaming Protocol (RTSP), the Real Time Messaging Protocol (RTMP), the Hypertext Transfer Protocol (HTTP), the Microsoft Media Services (MMS) protocol, etc. The program may be delivered as an adaptive bitrate stream or a progressive bitrate stream. In contrast to progressive video streaming, adaptive bitrate streaming provides greater flexibility in terms of playback (e.g., a user may skip around in a video without fully loading it), the video file can be changed (e.g., quality level) on the fly (e.g., from a network perspective), etc. A number of HTTP streaming technologies have been introduced that allow for adaptive bit-rate streaming, such as, for example, HTTP Dynamic Streaming, HTTP Live Streaming, and HTTP Smooth Streaming.

Typically, when HTTP adaptive streaming is used, a client (e.g., a video player or other software application) determines the bitrate in which to receive the program. However, this framework can create problems on the network-side since a network is continuously trying to service on-demand requests based on the "free-reign" of the clients' requests for network resources. Additionally, based on this framework, each client is essentially competing against other clients for network resources in which each client relies on its own perspective of a network condition. As a result, the user's experience may be unsatisfactory. For example, large and extreme swings of bandwidth consumption can result stemming from aggressive clients' demands, which in turn, can result in large swings in picture quality occurring for other clients.

Figure 1A:
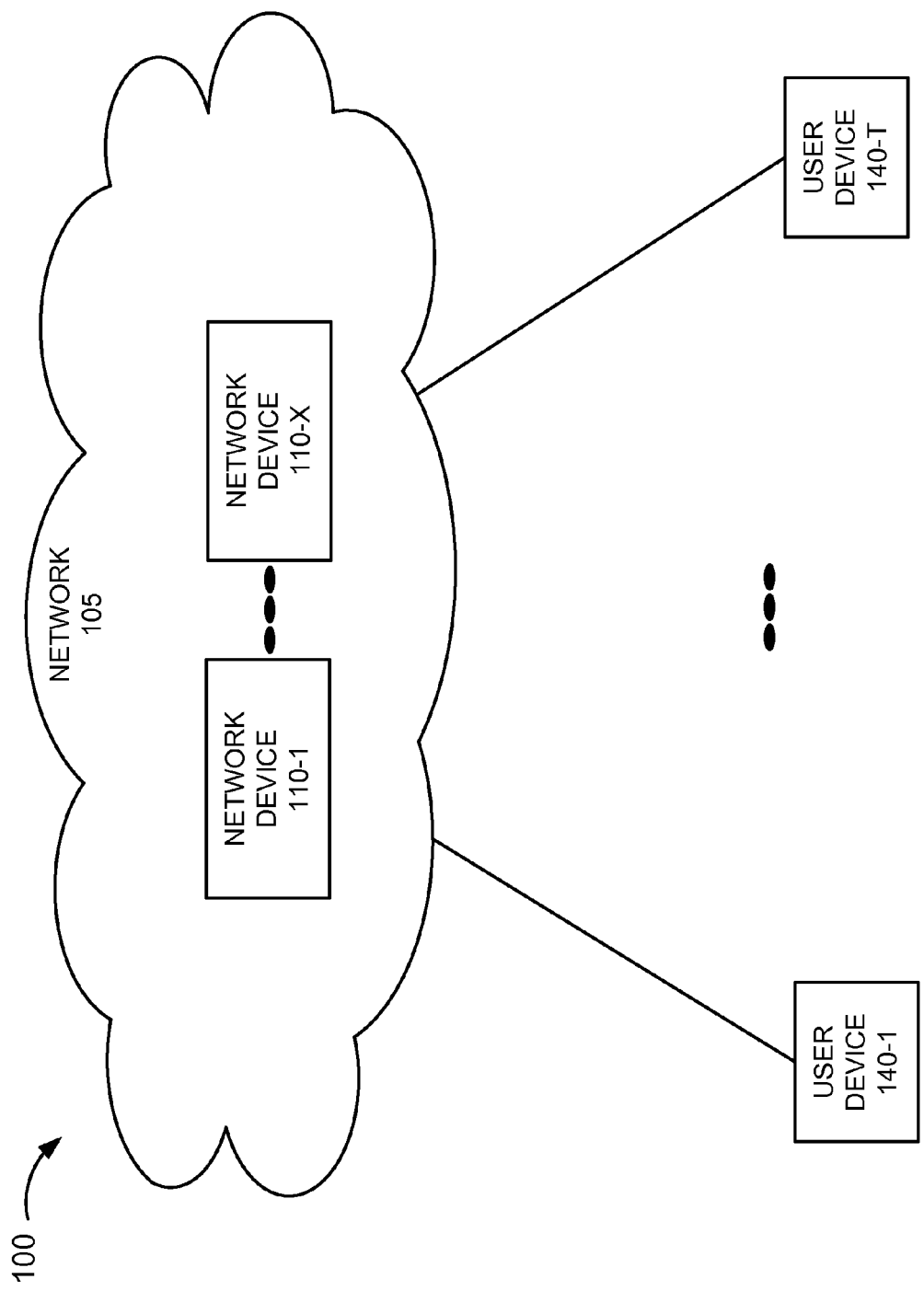
FIG. 1A is a diagram illustrating an exemplary environment in which exemplary embodiments may be implemented.

FIG. 1A is a diagram illustrating an exemplary environment 100 in which exemplary embodiments may be implemented. As illustrated, environment 100 includes a network 105. Network 105 includes network devices 110-1 through 110-X, in which X>1 (also referred to collectively as network devices 110 or individually as network device 110). Environment 100 also includes user devices 140-1 through 140-T, in which T>1 (also referred to collectively as user devices 140 or individually as user device 140).

Environment 100 may be implemented to include wired, optical, and/or wireless connections among the devices and the network illustrated. A connection may be direct or indirect and may involve an intermediary device and/or an intermediary network not illustrated in FIG. 1A. Additionally, the number and the arrangement of connections between the devices and the network of environment 100 are exemplary.

The number of devices and networks, and the configuration in environment 100 are exemplary. According to other embodiments, environment 100 may include additional devices, fewer devices, different devices, and/or differently arranged devices, than those illustrated in FIG. 1A. For example, a single device in FIG. 1A may be implemented as multiple devices and/or multiple devices may be implemented as a single device. Additionally, or alternatively, environment 100 may include an additional network and/or a differently arranged network, than that illustrated in FIG. 1A.

A device may be implemented according to a centralized computing architecture, a distributed computing architecture, or a cloud computing architecture. Additionally, a device may be implemented according to one or multiple network architectures (e.g., a client device, a server device, a peer device, a proxy device, and/or a cloud device).

According to other embodiments, environment 100 may include additional networks and/or different networks than those illustrated and/or described in reference to FIG. 1A. For example, environment 100 may include other types of network(s), such as the Internet, etc. Also, according to other embodiments, one or more functions and/or processes described as being performed by a particular device may be performed by a different device, or some combination of devices.

Network 105 includes a network provides an on-demand service to users. For example, network 105 includes a program repository that stores programs and a program delivery network to service on-demand requests. The on-demand service includes a bitrate guidance service, as described herein. Network 105 may be implemented as a satellite-based network, a terrestrial-based network, or a combination thereof. According to an exemplary implementation, network 105 provides programs to users that subscribe to a television service. Additionally, or alternatively, network 105 may provide programs to users that subscribe to other types of services, such as a mobile service, Internet service, or both. Network 105 may be implemented as a television distribution network, a mobile network, a program streaming network, a program downloading network, or other suitable network (e.g., the Internet, a vehicular communication network, etc.) for providing programs to users within an on-demand service.

Network devices 110 include network devices that are capable of performing processes, as described herein. For example, a portion of network devices 110 is capable of delivering programs to users via user devices 140. For example, this portion of network devices 110 may be implemented to deliver programs using various technologies, such as an optical architecture, a coaxial cable architecture, an Internet Protocol (IP) TV architecture, a digital subscriber line (DSL) architecture, a wireless architecture, and/or an Internet-based architecture. Depending on the architecture implemented, this portion of network devices 110 may include various types of program distribution devices, program storage devices, and other types of devices that contribute to the on-demand program service, such as, billing devices, security devices, customer profile devices, and application server devices. By way of further example, this portion of network devices 110 may include super headend (SHE) devices, video hub office (VHO) devices, video serving office (VSO) devices, routers, gateway devices, program server devices, interactive programming guide devices, load balancer devices, optical network termination (ONT) devices, switching devices, splitter devices, passive optical network (PON) devices, web servers, video on-demand servers, etc.

According to an exemplary embodiment, this portion of network devices 110 delivers programs according to an adaptive bitrate technology. For example, the on-demand service includes an adaptive bitrate streaming service. Additionally, for example, the on-demand service includes a downloading service. As described herein, the bitrate guidance service includes recommending bitrates to user devices 140 as a part of the adaptive bitrate streaming service. The recommended bitrates are calculated based on network state information. The bitrate guidance service may be applied to an adaptive downloading service.

A portion of network devices 110 is capable of monitoring the network state. For example, this portion of network devices 110 may monitor current bandwidth usage on links within network 105. This portion of network devices 110 may monitor other network resources (e.g., network devices 110) and other types of network states or conditions (e.g., a power outage, a crashed network device 110, a link failure, congestion, etc.). Based on an evaluation of the state of the network resources (e.g., utilization, available network resources, etc.), this portion of network devices 110 generates a recommended bitrate for delivery of a program. According to an exemplary embodiment, the recommended bitrate is directed to a category or a class of user device. For example, a recommended bitrate may be directed to a mobile device category (e.g., a device having a display that is below 12 inches) while another recommended bitrate may be directed to a big screen category (e.g., a device having a display that is 55 inches or above). The recommended bitrate is transmitted (e.g., broadcasted, multicasted) to user devices 140 and intended to be used by user devices 140 when requesting a bitrate for delivering a program. For example, the recommended bitrate may be multicasted to user devices 140 currently receiving a program. Additionally, or alternatively, the recommended bitrate may be broadcasted to all user devices 140 connected to network 105.

A portion of network devices 110 is capable of monitoring the compliance of user devices 140 in relation to the recommended bitrate. That is, this portion of network devices 110 determines whether user devices 140 abide by the recommended bitrate. Based on the monitoring of compliance, this portion of network devices 110 assigns positive points to those user devices 140 that abide by the recommended bitrates and assigns negative points to those user devices 140 that do not abide by the recommended bitrates. By way of example, assume that this portion of network devices 110 issues a recommended bitrate of 720p to a class of user devices 140 and one of the user devices 140, having received the recommendation, requests the delivery of a program at 1080p. As a result, this portion of network devices 110 assigns a negative point toward this user device 140. Conversely, assume the remaining user devices 140 abide by the recommended bitrate. In turn, this portion of network devices 110 assigns each remaining user device 140 a positive point. Additionally, user devices 140 that voluntarily opt for a bitrate below the recommended bitrate may be awarded additional positive points. Conversely, gradations of negative points may be assigned depending on the difference between the recommended bitrate and the bitrate requested.

As described further below, user devices 140 that have accumulated positive points may use these positive points to obtain a higher bitrate than what is currently recommended. Conversely, user devices 140 that have accumulated negative points may be penalized at a later time by restricting their bitrate to a bitrate that is lower than what is currently recommended. Additionally, or alternatively, other forms of positive and negative frameworks may be used. For example, in terms of billing, a positive point may correspond to a positive credit toward a user's bill.

A portion of network devices 110 is capable of providing a user interface to allow users to access and manage points assigned to users. In this way, for example, a user may identify whether he or she has positive or negative points. Additionally, for example, the user may apply positive points to his or her bill or allow other uses of the positive points.

User device 140 includes a device that interfaces with network 105 and/or presents a program to the user for consumption. For example, user device 140 may include a display device (e.g., a television, a smart television, a monitor), a set top box (e.g., a client device, a thin client device, a converter box, a receiver, a tuner, a digibox, an Internet Protocol Television (IPTV) set top box), a server device (e.g., a media server that includes tuners) that services one or multiple set top boxes, a mobile device (e.g., a smartphone, a tablet device, a netbook, etc.), a vehicular communication system, a computer (e.g., a desktop computer, a laptop computer, a palmtop computer, etc.), or other type of end user device (e.g., an Internet access device, etc.). According to an exemplary embodiment, user device 140 includes an agent. The agent performs functions as described herein, such as receiving a recommend bitrate message, selecting a bitrate for delivery of a program, and determining whether to accept or deny a recommended bitrate.

Figure 1B:
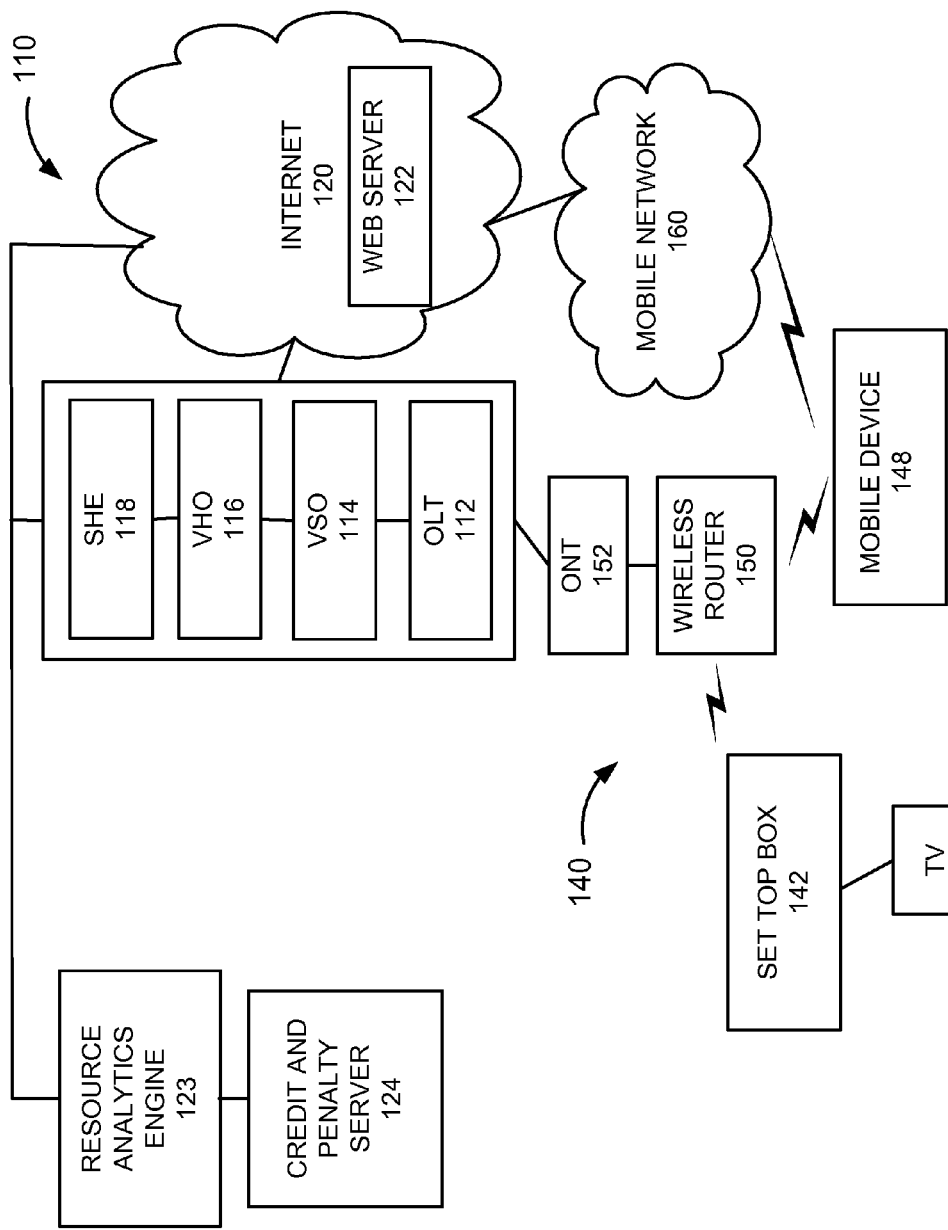
FIG. 1B is a diagram illustrating exemplary network elements and exemplary end user elements of the exemplary environment depicted in FIG. 1A.

FIG. 1B is a diagram illustrating exemplary implementations of network devices 110 and exemplary implementations of user devices 140. For example, a portion of network devices 110 is capable of delivering programs to users via user devices 140. For purposes of description, assume that a program delivery network is implemented to include an optical network. According to such an implementation, network devices 110 include an optical line termination (OLT) 112, a video serving office (VSO) 114, a video headend office (VHO) 116, and a super headend (SHE) 118. By way of example, OLT 112 serves as the program service provider's endpoint. OLT 112 may provide downstream and upstream frame processing, etc. VSO 114 distributes programs to user locations 135 via access networks. VHO 116 includes network elements that ingest programs on a regional level and a local level. VHO 116 may also provide on-demand services, etc. SHE 118 includes network elements that ingest programs on a national level. SHE 117 may aggregate, process, encode, and distribute programs to VHO 116.

VHO 116, VSO 114, and/or SHE 118 may also include storage devices that store user interfaces (e.g., interactive programming guides (IPGs), main menu, sub-menus, etc.) and programs pertaining to the program service, as well as video on-demand servers. Network devices 110 may also include network elements not specifically illustrated, such as switches, amplifiers, add/drop multiplexers, other types of intermediary network elements, etc. For example, VSO 114 may include gateway routers (GWRs), etc.

An exemplary implementation of network devices 110 may also include a web server 122. For example, web server 122 may provide downloading, and/or streaming of programs to users. Web server 122 may reside in Internet 120.

As previously described, according to an exemplary embodiment, an on-demand program service includes a bitrate guidance service. According to an exemplary implementation, a portion of network devices 110 that provide the bitrate guidance service includes a resource analytics engine 123 and a credit and penalty server 124.

Resource analytics engine 123 monitors the network state of network 105. For example, resource analytics engine 123 may obtain network state information from various network devices 110 (e.g., OLT 112, a video on-demand server, etc.) included in network 105 and/or from a network monitoring device (not illustrated). Given the amount of network state information that may be collected, an administrator may wish to obtain network state information relating to particular portions of network 105. For example, the administrator may wish to obtain network state information relating to particular links between network devices 110 that are subject to habitual congestion. In this regard, resource analytics engine 123 may be configured to obtain network state information pertaining to only a portion of network 105. Alternatively, resource analytics engine 123 may obtain network state information pertaining to the entire network 105. As previously described, the network state information includes current bandwidth usage. The network state information may include other forms of network states (e.g., a power outage, a crashed network device 110, a link failure, congestion, etc.). Resource analytics engine 123 may calculate or identify the available network resources based on the network state information. For example, resource analytics engine 123 may calculate or identify the current available bandwidth on a particular link.

Resource analytics engine 123 generates recommended bitrates based on the evaluation of network state information. According to an exemplary embodiment, resource analytics engine 123 uses network policies, rules, and/or heuristics as a basis for generating a recommended bitrate. For example, according to an exemplary implementation, resource analytics engine 123 generates recommended bitrates based on an objective to service as many users as possible. According to this implementation, resource analytics engine 123 may recommend a diminished bitrate for user devices 140 so as to service as many possible on-demand requests. For example, resource analytics engine 123 may generate a recommended diminished bitrate of 720p versus 1080p. Resource analytics engine 123 may recommend the diminished bitrate when a particular level of resource usage exists (e.g., when there is an 80% load, etc.). Resource analytics engine 140 may use historical data that indicates the number of on-demand requests typically received or serviced within a particular portion of network 105 to calculate the recommended bitrate. The historical data may also pertain to a certain time of day, which is another consideration that resource analytics engine 123 may take into account when generating a recommended bitrate.

According to another exemplary implementation, resource analytics engine 123 generates recommended bitrates based on an objective to service on-demand requests with the highest bitrate possible. According to this implementation, resource analytics engine 123 may tolerate high loads before recommending reduced bitrates. Similar to the previous implementation described, resource analytics engine 123 may use historical data as a basis to generate recommended bitrates, triggering events (e.g., when a particular level of network usage exists, etc.), predictions regarding future on-demand requests and corresponding resource usage, etc.

As previously described, according to an exemplary embodiment, resource analytics engine 123 generates a recommended bitrate directed toward a particular class or category of user device 140. Additionally, or alternatively resource analytics engine 123 may consider other factors, such as whether the program to be delivered is a paid program (e.g., a pay-per-view program) versus a free program. For example, according to an exemplary embodiment, resource analytics engine 123 may use a network policy that indicates that paid programs are afforded a higher recommended bitrate compared to free programs. While the exemplary implementations are not intended to be exhaustive, various embodiments not specifically described may be implemented that allows an administrator to configure resource analytics engine 123 to generate a recommend bitrate in accordance with various objectives, considerations, etc.

Resource analytics engine 123 generates a message that includes a recommended bitrate. The message may include multiple recommended bitrates. For example, each recommended bitrate may pertain to a particular class of user device 140. In this way, the agent of user device 140 selects the appropriate recommended bitrate based on the class or the category of user device 140 to which the recommended bitrate is directed. According to an exemplary embodiment, the message includes data indicating other parameters, such as a level of congestion (e.g., low, medium, high), region of network congestion (e.g., locally, state-wide, etc.), and/or portion of network congested (e.g., Internet links versus private IP links, etc.). Resource analytics engine 123 broadcasts or multicasts the message to user devices 140 via the program delivery network. An administrator may configure the frequency at which messages are transmitted and updated. For example, the message may be transmitted and/or updated every five minutes, every thirty minutes, etc.

Resource analytics engine 123 monitors the compliance of a recommended bitrate by user devices 140. For example, resource analytics engine 123 may receive program session information from video on-demand servers, etc. The program session information includes data indicating the bitrate requested and used by user device 140 during the program delivery session. The program session information also includes data that identifies user device 140. The program session information may also include data indicating the video on-demand server, etc., so that resource analytics engine 123 may recognize the portion of network 105 to which the recommended bitrate pertains. Resource analytics engine 123 calculates compliance relative to the recommended bitrate. Resource analytics engine 123 may store recommendation information (e.g., recommended bitrates, portions of network 105 to which the recommended bitrates pertain, congestion levels, network resource utilizations, timestamps (e.g., day and time, etc.)) to calculate the compliance. For example, resource analytics engine 123 may compare the recommendation information to the program session information to calculate the compliance. Resource analytics engine 123 monitors the compliance during the program delivery session due to a change in network state conditions, which in turn, may cause the recommended bitrate to change, and consequently the measurement of compliance, credits and penalties assigned, etc.

Resource analytics engine 123 uses a credit and penalty scheme based on the compliance of user devices 140. According to an exemplary implementation, resource analytics engine 123 uses a point system in which positive points are assigned to a user when the user complies with the recommended bitrate and negative points are assigned to a user when the user does not comply with the recommended bitrate. Positive points may be used for various purposes, such as credit to a bill, upgrade a bitrate above a recommended bitrate without penalty, viewing of a paid program for free, etc. Conversely, negative points may be used for various purposes, such as downgrading a bitrate below a recommended bitrate. The number of points assigned is commensurate with a level of compliance. For example, as previously described, when a user complies with a recommended bitrate by accepting the recommended bitrate, the user is assigned a certain number of positive points. However, when a user complies with a recommended bitrate by having a program delivered at a bitrate below the recommended bitrate, the user is assigned a greater number of positive points. The converse is true when the user does not comply with a recommended bitrate.

Credit and penalty server 124 stores and provides user access to the credits and penalties assigned to users. For example, credit and penalty server 124 provides graphical user interfaces that allow users to view their credits and penalties, options on how positive points are used, etc. Credit and penalty server 124 receives credit and penalty information from resource analytics engine 123. Credit and penalty server 124 may store a database or a suitable data structure to store the credit and penalty information.

As further illustrated in FIG. 1B, the program delivery network may also include a mobile network 160. For example, although not illustrated, network devices 110 may include enhanced Node Bs (eNBs), serving gateways (SGWs), etc., of a Long Term Evolution (LTE) network. Additionally, or alternatively, mobile network 160 may include network devices 110 of another wireless communication standard.

Also illustrated in FIG. 1B are exemplary end user devices 140. For example, user device 140 may include a set top box 142 and a television (TV) 144. Set top box 142 may be implemented as a converter box, a television receiver, a tuner device, a digibox device, an Internet Protocol (IP) set top box, an IPTV set top box, and/or some other form of a set top box. TV 144 may be implemented as a digital television or a smart television. According to other embodiments, for example, user device 140 may include a mobile device 148. Mobile device 148 may be implemented as a smartphone, a tablet, a netbook, a computer, or other suitable mobile or portable communicative device.

As previously described, user device 140 includes an agent for providing the bitrate guidance service from an end user perspective. An exemplary embodiment of the agent is described further below. As previously described, a message that includes a recommended bitrate is transmitted (e.g., broadcasted, multicasted) to user devices 140. The agent includes logic to listen for the message so as to obtain the recommended bitrate. For example, according to a multicast scenario, the agent may join a specific IP multicast at a particular IP address and port number. By way of further example, according to a broadcast scenario, the agent may listen to an IP broadcast address. Still further, the message may be embedded in the program stream. The agent may identify the recommended bitrate in the program stream. According to an exemplary implementation, the agent listens for the message in response to a triggering event. For example, when the user navigates to a particular user interface, connects to a particular network device 110 (e.g., a video on-demand server (not illustrated), web server 122, etc.), or some other type of activity that indicates the user's intent to issue a request for an on-demand program, the agent listens for the message to obtain the recommended bitrate. Alternatively, when user device 140 receives an input for selecting a program from the on-demand service, the agent listens for the message.

Depending on the periodicity at which the message is transmitted, etc., the agent may be configured to listen for the message in a manner that minimizes any wait-time for a user. For example, the agent of user device 140 may listen for the message regardless of any triggering event and may store the recommended bitrate, as well as any other additional parameters included in the message. In this regard, the agent may receive the message at any time, including during the playing of the program on user device 140.

According to an exemplary embodiment, when the agent obtains the recommended bitrate, the agent causes a user interface to be displayed that informs the user of the recommended bitrate. The user may decide to accept or refuse the recommended bitrate proximate to the time the program is about to be viewed. Of course, if messages are transmitted periodically or aperiodically, and a recommended bitrate may be received during the viewing of the program, displaying a user interface that informs the user to accept or refuse the recommended bitrate may not be advisable since such an interruption would degrade the user's viewing experience. In this regard, the agent may operate according to user preferences, as described further below.

According to another exemplary embodiment, the agent may allow a user to set certain preferences. For example, the agent may allow the user to store a preference that instructs the agent to always accept the recommended bitrate or always deny the recommended bitrate. The agent may allow the user to set other preferences, such as, accumulate as many credits as possible, use as many credits as possible (e.g., upgrade the bitrate from the recommended bitrate), maintain at least a minimal bitrate of X, reduce my negative points by X points, etc.

According to an exemplary embodiment, the agent may display various types of information pertaining to the bitrate guidance service. For example, the agent may display various icons that indicate a level of congestion in network 105 (e.g., high, low, etc.) and/or which portion of network 105 is congested (e.g., local to user's area, Internet, private IP network, etc.), etc. In this way, the user is informed and may have some understanding as to why the recommended bitrate is a particular bitrate (e.g., a lower bitrate than user expectation, etc.). Additionally, the user may make a more informed decision as to which source (e.g., program delivery network) to obtain the program. By way of example, assume the user is attempting to view a program from web server 122, which resides in Internet 120, and an icon indicates congestion in the Internet. The user may not be satisfied with the recommended bitrate. In response, the user may wish to see if the program is available via another communication path (e.g., via VSO 114, etc.). According to an exemplary embodiment, the user may request that the agent obtain a current congestion level via the alternate communication path. In response to this request, the agent may ping resource analytics engine 123 for this information. The agent displays the congestion level to the user. Additionally, or alternatively, the user may request that the agent identify whether the same program is available from an alternate source (e.g., a video on-demand server residing in VSO 114). In response to this request, the agent redirects the user to a program server (which stores data indicating available programs, etc.). The user may then search to see if the program is available and if so, the user may view the program from this alternate source. Additionally, resource analytics engine 123 may assign a credit to the user given the inconvenience and the user's desire to assist in minimizing the congestion in the Internet.

As previously described, typically, when an adaptive bitrate environment is used, the client requests a bitrate for receiving a program, which may create problems on the network-side since the network is continuously trying to service on-demand requests based on the "free-reign" of the clients' request for network resources. In contrast, however, as described herein, user device 140 requests a bitrate based on the user's wishes, which are communicated via the agent (e.g., via a user preference, responding to a user interface prompt, etc.). The agent may generate an on-demand request or other message that indicates a requested bitrate. Alternatively, the agent may instruct or pass-on to another entity (e.g., a media player, etc.) the bitrate to request or accept.

For the sake of description, the agent may be implemented in various ways. For example, the agent may be implemented as a plugin for a web browser, a media player, or some other type of client. Alternatively, the agent may be implemented as a stand-alone application.

Also illustrated in FIG. 1B are exemplary intermediary devices between user device 140 and network devices 110, such as a wireless router 150 and an optical network terminal (ONT) 152. Wireless router 150 may be implemented as an in-home router device, a broadband router, or a wireless router. Optical network terminal (ONT) 152 may be implemented as a conventional or a well-known ONT that interfaces with the optical network previously described.

The number of network devices 110, user devices 140, and the configuration illustrated in FIG. 1B are exemplary. According to other embodiments, network devices 110 may include additional network devices, fewer network devices, different network devices, and/or differently arranged network devices, than those illustrated in FIG. 1B. For example, network devices 110 may include network devices that provide other types of services or functions, such as Internet service, mobile service, or alternatively merely access to one or more of these various services or functions. The connections illustrated in FIG. 1B are exemplary.

Figure 1C:
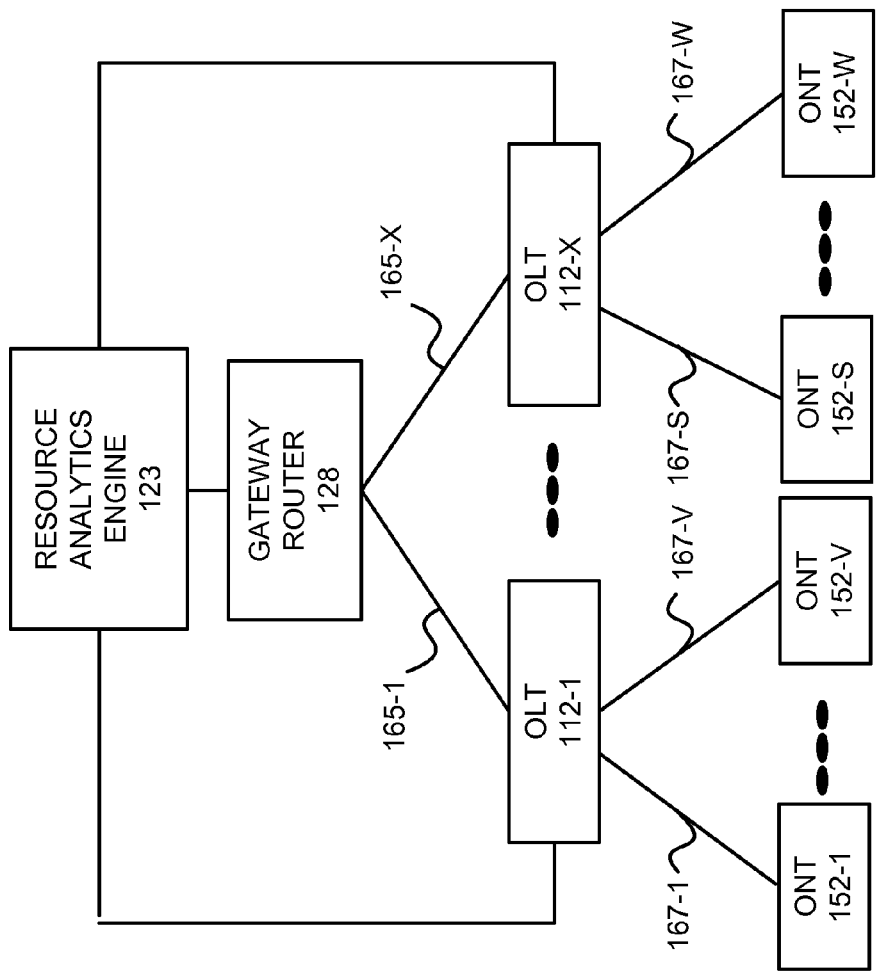
FIG. 1C is a diagram illustrating an exemplary configuration that includes a resource analytics engine that performs an exemplary embodiment of a bitrate guidance service.

Resource analytics engine 123 may be implemented within various places in network 105 and may be communicatively coupled to various network devices 110. Resource analytics engine 123 may be implemented in a centralized or a distributed manner. FIG. 1C is a diagram illustrating an exemplary configuration that includes resource analytics engine 123. Resource analytics engine 123 manages the handling of on-demand service requests for programs based on the bitrate guidance service. According to this exemplary configuration, resource analytics engine 123 obtains network state information, which includes bandwidth usage data for links 165-1 through 165-X (also referred to as links 165 and individually as link 165), and for links 167-1 through 167-V and links 167-S through 167-W (also referred to as links 167 and individually as link 167).

Described below is an exemplary scenario pertaining to the bitrate guidance service. Various functions are described as being performed by resource analytics engine 123 and set top box 142 to provide an exemplary embodiment of the bitrate guidance service. According to an exemplary implementation, resource analytics 123 is a part of VSO 114.

FIGS. 2A-2F are diagrams illustrating an exemplary process pertaining to the bitrate guidance service. Referring to FIG. 2A, resource analytics engine 123 obtains network state information from various network devices 110 of network 105. As previously described, the network state information may pertain to links (e.g., current bandwidth usage, links up, links down, etc.) and/or network devices 110 (e.g., program session information, crashed network device 110, congestion levels, etc.). In response to receiving the network state information, resource analytics engine 123 analyzes the network state information. For example, resource analytics engine 123 analyzes the network state information based on network policies, rules, and/or heuristics. Additionally, or alternatively, resource analytics engine 123 may use historical data. The historical data may include the arrival times of on-demand program requests, requested bitrates, durations of the program sessions, bandwidth usage, link identifiers, etc. For example, resource analytics engine 123 may predict future bandwidth usage based on the historical data. By way of further example, resource analytics engine 123 may generate prediction data that indicates bandwidth usage over time (e.g., a bandwidth signature) for a particular link or portion of network 105. Resource analytics engine 123 may use various models, such as for example, goodness of fit (e.g., root mean-square error, average percent error, etc.), time series models (e.g., auto-regressive, moving average, auto-regressive moving average, auto-regressive integrated moving average, etc.), and/or other well-known methods. Resource analytics engine 123 may consider a variety of variables, such as for example, the day of the week, the time of day, the geographic area in which the on-demand service provides programs, etc. While the complexities in which resource analytics engine 123 predicts network resource usage expand beyond the scope of this description, resource analytics engine 123 may be configured to forecast network resource usage and use this information as a basis for calculating a recommended bitrate. As illustrated in FIG. 2A, resource analytics engine 123 generates a recommended bitrate based on the analysis.

Referring to FIG. 2B, resource analytics engine 123 generates a message that includes the recommended bitrate. As previously described, the message may include other data, such as data indicating a class or category of user device 140, level of current congestion, region of congestion, etc. Resource analytics engine 123 transmits the message in a broadcast or multicast fashion to user devices 140, which includes set top box 142.

As previously described, the agent of set top box 142 may listen to the message in response to a triggering event (e.g., an event that indicates user 205's intent to view an on-demand program). According to other implementations, however, a triggering event may not be used and the agent may continuously listen for the message. For example, the message or the data of the message may be carried or piggy-backed in various in-band or out-of-band messages. The data included in the message is stored by the agent on user device 140.

Referring to FIG. 2C, assume user 205 wishes to receive an on-demand program and navigates to a graphical user interface that allows user 205 to select an on-demand program. Based on this triggering event, the agent identifies the recommend bitrate. User 205 selects an on-demand program to view via the graphical user interface.

As previously described, various approaches may be implemented to determine a requested bitrate. For example, set top box 142 may store a user preference. Alternatively, set top box 142 may display, in response to receiving the selection of the on-demand program, an overlay that indicates the recommend bitrate. User 205 may accept, deny, or input a different bitrate (e.g., via a remote control device), in response to viewing the overlay. According to this exemplary scenario, assume user 205 accepts the recommended bitrate and the agent abides by the recommended bitrate.

Referring to FIG. 2D, set top box 142 transmits a request for the on-demand program, which includes the recommended bitrate. Video on-demand server 207 receives the request and provides the requested on-demand program, at the recommended bitrate, to set top box 142. Set top box 142 receives and displays the on-demand program via TV 144.

As further illustrated in FIG. 2D, resource analytics engine 123 monitors the compliance of the recommended bitrate. For example, video on-demand server 207 may store program session information that includes the bitrate at which programs are delivered. Video on-demand server 207 provides the program session information to resource analytics engine 123. Resource analytics engine 123 stores the program session information.

Referring to FIG. 2E, resource analytics engine 123 calculates a credit that is commensurate with user 205's compliance with the recommended bitrate. Resource analytics engine 123 generates credit information indicative of the credit. Resource analytics engine 123 assigns the credit information to user 205. For example, as previously described, resource analytics engine 123 assigns positive points to an account associated with user 205.

Referring to FIG. 2F, resource analytics engine 123 transmits credit information to credit and penalty server 124. Although credit and penalty server 124 is shown outside of VSO 114, according to other implementations, credit and penalty server 124 may be inside of VSO 114. As previously described, credit and penalty server 124 stores the credit information and makes the credit information available to user 205. For example, user 205 may log in credit and penalty server 124 to access this information. User 205 may manage the credit information, such as applying the credit to a bill, etc., as previously described. According to another exemplary embodiment, credit and penalty server 124 may push the credit information to the agent of set top box 142. User 205 may access the credit information by navigating to a particular user interface. User 205 may then identify the number of credits accumulated. User 205 may also be able to manage the credit.

FIG. 3 is a diagram illustrating exemplary components of a device 300 that may correspond to one or more of the devices in the environments described herein. For example, device 300 may correspond to resource analytics engine 123, user device 140, as well as other network devices. As illustrated, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a computer program that provides a function and/or a process. Software 315 may include firmware. For example, with reference to resource analytics engine 123, software 315 may include an application that, when executed by processor 315, provides the functions as described herein. Additionally, for example, with reference to the agent of user device 140, software 315 may include an application that, when executed by processor 315, provides the functions as described herein.

Communication interface 320 permits device 300 to communicate with other devices, networks, systems, etc. Communication interface 320 may include one or multiple wireless interfaces and/or wired interfaces. Communication interface 320 may include one or multiple transmitters and receivers or transceivers. Communication interface 320 may operate according to a protocol and a communication standard.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 may cause processor 305 to perform a process described herein. Alternatively, for example, according to other implementations, device 300 may perform a process described herein based on the operation of hardware (processor 305, etc.).

Figure 4:
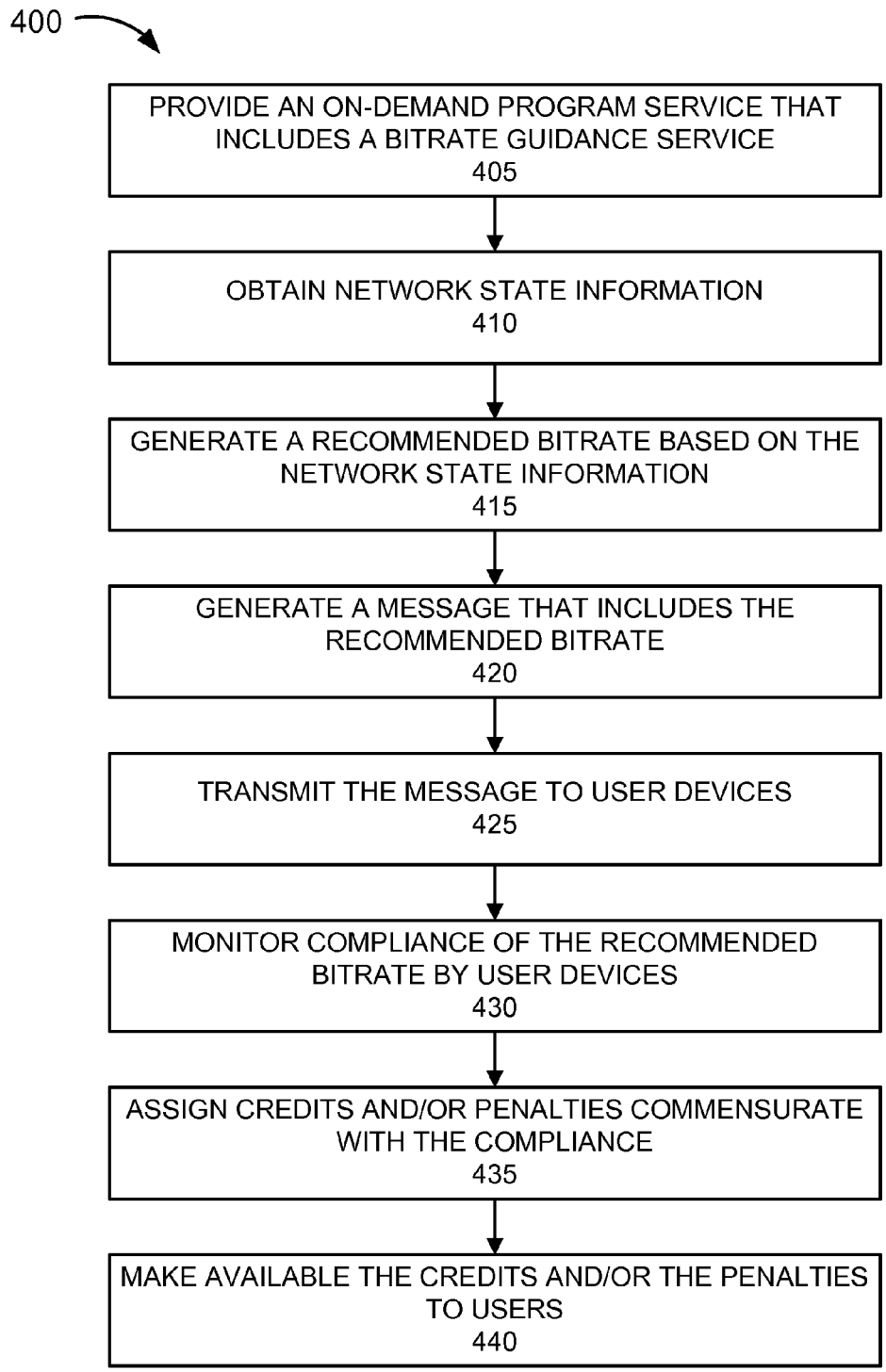
FIG. 4 is a flow diagram that illustrates an exemplary process pertaining to the bitrate guidance service.

FIG. 4 is a flow diagram illustrating an exemplary process 400 pertaining to the bitrate guidance service. Process 400 is directed to a process previously described above with respect to FIGS. 2A-2F and elsewhere in this description, in which resource analytics engine 123 provides a bitrate guidance service. According to an exemplary embodiment, resource analytics engine 123 performs the steps described in process 400. For example, processor 305 may execute software 315 to perform the steps described.

Referring to FIG. 4, process 400 begins by providing an on-demand program service that includes a bitrate guidance service (block 405). For example, network 105 offers on-demand programs to users via a streaming service. The on-demand service includes a bitrate guidance service that recommends bitrates to agents of user devices 140. Resource analytics engine 123 provides functions in support of the recommended bitrate, as described herein.

In block 410, network state information is obtained. For example, as previously described, resource analytics engine 123 obtains network state information from various network devices 110 of network 105.

In block 415, a recommended bitrate is generated based on the network state information. For example, as previously described, resource analytics engine 123 generates a recommended bitrate based on the network state information. By way of example, when the network state information indicates a high level of usage (e.g., network load), resource analytics engine 123 may reduce the bitrate at which user devices 140 should receive on-demand programs. As previously described, resource analytics engine 123 may use other data (e.g., historical data, prediction data), rules, heuristics, etc., to generate the recommended bitrate. Additionally, resource analytics engine 123 may generate the recommended bitrate for a particular category of user device 140, user, etc.

In block 420, a message that includes the recommended bitrate is generated. For example, as previously described, resource analytics engine 123 generates a message that includes the recommended bitrate. The message may include other parameters (e.g., level of congestion, portion of network, etc.), as previously described.

In block 425, the message is transmitted to user devices. For example, as previously described, resource analytics engine 123 transmits the message to user devices 140.

In block 430, compliance of the recommended bitrates by the user devices is monitored. For example, as previously described, resource analytics engine 123 monitors the compliance of bitrates by user devices 140.

In block 435, credits and/or penalties, which are commensurate with the compliance, are assigned. For example, as previously described, resource analytics engine 123 assigns credits to users that comply with the recommended bitrate and assigns penalties to users that do not comply with the recommended bitrate.

In block 440, the credits and/or the penalties are made available to the users. For example, resource analytics engine 123 stores the credits and penalties on credit and penalty server 124. Users may view and manage their credits and penalties via credit and penalty server 124.

Although FIG. 4 illustrates an exemplary bitrate guidance process 400, according to other embodiments, process 400 may include additional operations, fewer operations, and/or different operations than those illustrated in FIG. 4 and described herein. For example, assume that a user decides to use credits for upgrading the bitrate above the recommended bitrate. According to such a use case, resource analytics engine 123 will need to be informed of the user's use of his or her credits so that the user is considered compliant with the recommended bitrate. By way of example, when a user of user device 140 requests an on-demand program, the agent may obtain credit/penalty information (e.g., from credit and penalty server 124). This information may be presented to the user via an icon or a graphical user interface. For the sake of description, assume that the user has credits and elects to use the credits. An on-demand request may include this information and, in turn, this information may be included in the program session information, which is obtained by resource analytics engine 123. In this way, resource analytics engine 123 will not unfairly penalize the user for not abiding by the recommended bitrate. Other approaches may be used to achieve a similar result.

Figure 5:
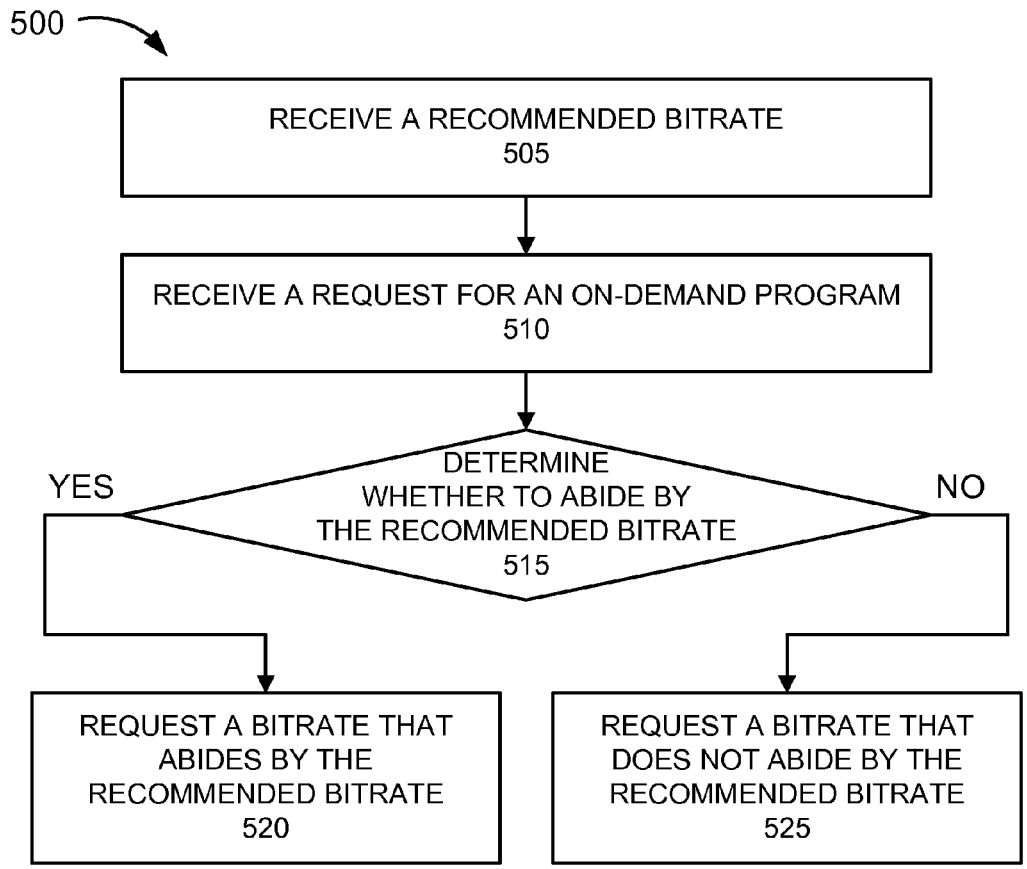
FIG. 5 is a flow diagram that illustrates another exemplary process pertaining to the bitrate guidance service.

FIG. 5 is a flow diagram illustrating another exemplary process 500 pertaining to the bitrate guidance service. Process 500 is directed to a process previously described above with respect to FIGS. 2C-2F and elsewhere in this description, in which an agent of user device 140 provides a bitrate guidance service. According to an exemplary embodiment, the agent of user device 140 performs the steps described in process 500. For example, processor 305 may execute software 315 to perform the steps described.

Referring to FIG. 5, process 500 begins by receiving a recommended bitrate. For example, as previously described, the agent of user device 140 receives a message that includes a recommended bitrate. The agent stores the message information.

In block 510, a request for an on-demand program is received. For example, as previously described, a user of user device 140 accesses an on-demand program service that includes the bitrate guidance service.

In block 515, it is determined whether to abide by the recommended bitrate. For example, as previously described, the agent may determine whether to abide by the recommended bitrate based on a (stored) user preference, a response to a prompt, or other user input received.

If it is determined to abide by the recommended bitrate (block 515-YES), then a bitrate is requested that abides by the recommended bitrate (block 520). For example, as previously described, the agent of user device 140 identifies the (stored) recommended bitrate and generates a request for an on-demand program corresponding to the recommended bitrate. The bitrate requested may be equal to or less than the recommended bitrate. The request is transmitted to network 105 (e.g., video on-demand server 207).

If it is determined to not abide by the recommended bitrate (block 515-NO), then a bitrate is requested that does not abide by the recommended bitrate (block 525). For example, as previously described, the agent of user device 140 generates a request for an on-demand program that is above the recommended bitrate. The request is transmitted to network 105 (e.g., video on-demand server 207).

Although FIG. 5 illustrates an exemplary bitrate guidance process 500, according to other embodiments, process 500 may include additional operations, fewer operations, and/or different operations than those illustrated in FIG. 5 and described herein.

The foregoing description of embodiments provides illustration, but is not intended to be exhaustive or to limit the embodiments to the precise form disclosed. Accordingly, modifications to the embodiments described herein may be possible. For example, according to other embodiments, the bitrate guidance service may omit certain steps described herein. For example, the bitrate guidance service may omit monitoring compliance and/or non-compliance of users. In this way, from a network perspective, an on-demand service provider may merely wish to obtain any benefit from its users from the fact that some of the users comply with the recommended bitrate without the expenditure of resources to monitor compliance and/or non-compliance and assign credits and penalties. According to another embodiment, for example, the bitrate guidance service may monitor compliance and/or non-compliance of users but not use the credit and penalty system. Alternatively, the bitrate guidance service may monitor only compliance of users and assign credit to the users that comply. By way of another example, users may be able to purchase credits for consumption during network congestion periods and/or pay to eliminate negative points.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4 and 5, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

No element, act, or instruction described in the present application should be construed as critical or essential to the embodiments described herein unless explicitly described as such.

What is claimed is:

1. A method comprising:
providing an adaptive bitrate streaming service of programs;
obtaining, by a network device, network state information pertaining to at least a portion of a network that provides the adaptive bitrate streaming service;
generating, by the network device, a recommended bitrate for delivery of a program based on the network state information;
transmitting the recommended bitrate to user devices;
monitoring, by the network device, a compliance and a non-compliance of the recommended bitrate by the user devices; and
assigning, by the network device, a credit commensurate with the compliance of the recommended bitrate to each of the user devices that complied with the recommended bitrate and a penalty commensurate with the non-compliance of the recommended bitrate to each of the user devices that did not comply with the recommended bitrate.

2. The method of claim 1, further comprising:
storing the credit and the penalty assigned to the user devices; and
allowing each user of the user devices that received the credit to use the credit to receive a program at a bitrate that is higher than the recommended bitrate.

3. The method of claim 1, further comprising:
collecting historical network state information; and
generating, based on the historical network state information, prediction data that indicates network resource usage pertaining to a future time window; and wherein the generating the recommended bitrate further comprises:
generating the recommended bitrate based on the prediction data, and wherein the network state information includes bandwidth usage pertaining to at least the portion of the network.

4. The method of claim 1, wherein the generating the recommended bitrate further comprises:
generating the recommended bitrate based on a class of user device, wherein the user devices are classified based on a size of a display.

5. The method of claim 1, further comprising:
receiving, by the user devices, the recommended bitrate;
determining whether to abide by the recommended bitrate;
requesting a bitrate equal to or lower than the recommended bitrate in response to determining to abide by the recommended bitrate; and
requesting a bitrate above the recommended bitrate in response to determining to not abide by the recommended bitrate.

6. The method of claim 1, wherein the assigning comprises:
assigning additional credit to each user device that requests a bitrate below the recommended bitrate, and the method further comprising:
prompting, via a user interface, each user to accept or deny the recommended bitrate; and
receiving, via the user interface, a user response to the prompting.

7. The method of claim 1, wherein network state information includes bandwidth usage information pertaining to one or more links of at least the portion of the network, and the method further comprising:
identifying a remaining portion of a bandwidth based on the bandwidth usage information.

8. The method of claim 1, further comprising:
generating a message that includes the recommended bitrate, and wherein the message includes at least one of an indicator that indicates at least one of a level of congestion or a region of the network to which the level of congestion pertains.

9. A network device comprising:
a communication interface;
a memory, wherein the memory stores instructions; and
a processor, wherein the processor executes the instructions to:
obtain, via the communication interface, network state information pertaining to at least a portion of a network that provides an adaptive bitrate streaming service;
generate a recommended bitrate for delivery of a program based on the network state information;
transmit, via the communication interface, the recommended bitrate to user devices;
monitor a compliance and a non-compliance of the recommended bitrate by the user devices; and
assign a credit commensurate with the compliance of the recommended bitrate to each of the user devices that complied with the recommended bitrate and a penalty commensurate with the non-compliance of the recommended bitrate to each of the user devices that did not comply with the recommended bitrate.

10. The network device of claim 9, wherein the processor further executes the instructions to:
store the credit and the penalty assigned to the user devices; and
allow each user of the user devices that received the credit to use the credit to receive a program at a bitrate that is higher than the recommended bitrate.

11. The network device of claim 9, wherein the processor further executes the instructions to:
collect historical network state information;
generate, based on the historical network state information, prediction data that indicates network resource usage pertaining to a future time window; and wherein, when generating the recommended bitrate the processor further executes the instructions to:
generate the recommended bitrate based on the prediction data, and wherein the network state information includes bandwidth usage pertaining to at least the portion of the network.

12. The network device of claim 9, wherein the processor further executes the instructions to:
generate the recommended bitrate based on a class of user device, wherein the user devices are classified based on a size of a display.

13. The network device of claim 9, wherein the processor further executes the instructions to:
generate a message that includes the recommended bitrate, and wherein the message includes at least one of an indicator that indicates at least one of a level of congestion or a region of the network to which the level of congestion pertains.

14. The network device of claim 9, wherein the processor further executes the instructions to:
obtain program session information pertaining to on-demand sessions of the user devices; and
determine whether each of the user devices abides by or does not abide by the recommended bitrate based on the program session information.

15. The network device of claim 9, wherein the processor further executes the instructions to:
store recommendation information that includes the recommended bitrate, network resource utilization data, and timestamp data; and
determine whether each of the user devices abides by or does not abide by the recommended bitrate based on the recommendation information.

16. A non-transitory storage medium storing instructions executable by a computational device to:
obtain network state information pertaining to at least a portion of a network that provides an adaptive bitrate streaming service;
generate a recommended bitrate for delivery of a program based on the network state information;
transmit the recommended bitrate to user devices;
monitor a compliance and a non-compliance of the recommended bitrate by the user devices; and
assign a credit commensurate with the compliance of the recommended bitrate to each of the user devices that complied with the recommended bitrate and a penalty commensurate with the non-compliance of the recommended bitrate to each of the user devices that did not comply with the recommended bitrate.

17. The non-transitory storage medium of claim 16, further storing instructions executable by the computational device to:
collect historical network state information; and
generate, based on the historical network state information, prediction data that indicates network resource usage pertaining to a future time window; and wherein the instructions to generate the recommended bitrate further comprise instructions to:
generate the recommended bitrate based on the prediction data, and wherein the network state information includes bandwidth usage pertaining to at least the portion of the network.

18. The non-transitory storage medium of claim 16, further storing instructions executable by the computational device to:
generate a message that includes the recommended bitrate, and wherein the message includes at least one of an indicator that indicates at least one of a level of congestion or a region of the network to which congestion pertains.

19. The non-transitory storage medium of claim 16, wherein the instructions to generate the recommended bitrate further comprise instructions to:
generate the recommended bitrate based on a class of user device, wherein the user devices are classified based on a size of a display.

20. The non-transitory storage medium of claim 16, wherein network state information includes bandwidth usage information pertaining to one or more links of at least the portion of the network, and the non-transitory storage medium further storing instructions to:
identify a remaining portion of a bandwidth based on the bandwidth usage information.

21. A method comprising:
obtaining, by a network device, network state information pertaining to at least a portion of a network that provides an adaptive bitrate streaming service;
generating, by the network device, a recommended bitrate for delivery of a program based on the network state information and a class pertaining to user devices;
transmitting the recommended bitrate to the user devices;
monitoring, by the network device, a compliance and a non-compliance of the recommended bitrate by the user devices; and assigning, by the network device, a credit commensurate with the compliance of the recommended bitrate to each of the user devices that complied with the recommended bitrate and a penalty commensurate with the non-compliance of the recommended bitrate to each of the user devices that did not comply with the recommended bitrate.

22. The method of claim 21, further comprising:
generating a message that includes the recommended bitrate, and wherein the message includes at least one of an indicator that indicates at least one of a level of congestion or a region of the network to which the level of congestion pertains.

23. The method of claim 21, further comprising:
collecting historical network state information; and
generating, based on the historical network state information, prediction data that indicates network resource usage pertaining to a future time window; and wherein the generating the recommended bitrate further comprises:
generating the recommended bitrate based on the prediction data, and wherein the network state information includes bandwidth usage pertaining to at least the portion of the network.

\* \* \* \* \*